(12) United States Patent  (10) Patent No.: US 8,684,383 B1
Mullins                    (45) Date of Patent:    Apr. 1, 2014

(54) ADJUSTABLE SUSPENSION SYSTEM AND METHOD FOR SUSPENDING A VEHICLE

(71) Applicant: Raymond Mullins, Bourbonnais, IL (US)

(72) Inventor: Raymond Mullins, Bourbonnais, IL (US)

( * ) Notice: Subject to any disclaimer, the term of this patent is extended or adjusted under 35 U.S.C. 154(b) by 0 days.

(21) Appl. No.: 13/677,942

(22) Filed: Nov. 15, 2012

(51) Int. Cl.
*B60G 3/02*     (2006.01)
*B60G 9/02*     (2006.01)
*B62H 1/02*     (2006.01)

(52) U.S. Cl.
USPC ................ 280/124.11; 280/767; 280/295

(58) Field of Classification Search
USPC .......... 280/124.11, 124.116, 124.128, 755, 280/767, 762, 293, 295, 296, 86.5; 180/209, 16
See application file for complete search history.

(56) References Cited

U.S. PATENT DOCUMENTS

| | | | | |
|---|---|---|---|---|
| 2,974,976 A * | 3/1961 | Lyall | ........................... | 280/86.5 |
| 3,794,344 A * | 2/1974 | Raidel | ........................ | 280/86.5 |
| 4,230,341 A * | 10/1980 | Hart et al. | ............... | 280/124.128 |
| 4,253,679 A * | 3/1981 | Sargent | ........................ | 280/405.1 |
| 4,763,953 A * | 8/1988 | Chalin | .......................... | 298/17 S |
| 5,713,424 A * | 2/1998 | Christenson | ............... | 180/24.02 |
| 5,853,057 A | 12/1998 | Mullins | | |
| 6,003,885 A * | 12/1999 | Richardson | .................. | 280/86.5 |
| 6,155,368 A | 12/2000 | Mullins | | |
| 6,182,989 B1 * | 2/2001 | Negele | ................... | 280/124.116 |
| 6,419,247 B1 * | 7/2002 | Moran | ......................... | 280/86.5 |
| 6,454,289 B1 | 9/2002 | Mullins | | |
| 6,494,283 B1 | 12/2002 | Mullins | | |
| 6,739,420 B2 | 5/2004 | Mullins | | |
| 6,758,535 B2 * | 7/2004 | Smith | ........................... | 301/128 |
| 7,222,881 B1 * | 5/2007 | Zhou | .............................. | 280/755 |
| 7,277,774 B2 | 10/2007 | Yamagishi et al. | | |
| 7,398,981 B1 * | 7/2008 | Ener et al. | .................... | 280/86.5 |
| 8,075,011 B1 * | 12/2011 | Duzzny | ........................ | 280/293 |
| 8,113,531 B2 * | 2/2012 | Zhou et al. | ................. | 280/304.1 |

* cited by examiner

*Primary Examiner* — Drew Brown
(74) *Attorney, Agent, or Firm* — Patents + TMS, P.C.

(57) ABSTRACT

A suspension apparatus for a vehicle has a frame with a first portion and a second portion substantially perpendicular to the first portion. A swing arm is pivotably connected to the frame allowing movement of the swing arm. A striker contacts the first portion of the frame. A travel stop connects to the frame to limit the movement of the swing arm. A spindle and a hub connect to the spindle for connecting a wheel.

19 Claims, 2 Drawing Sheets

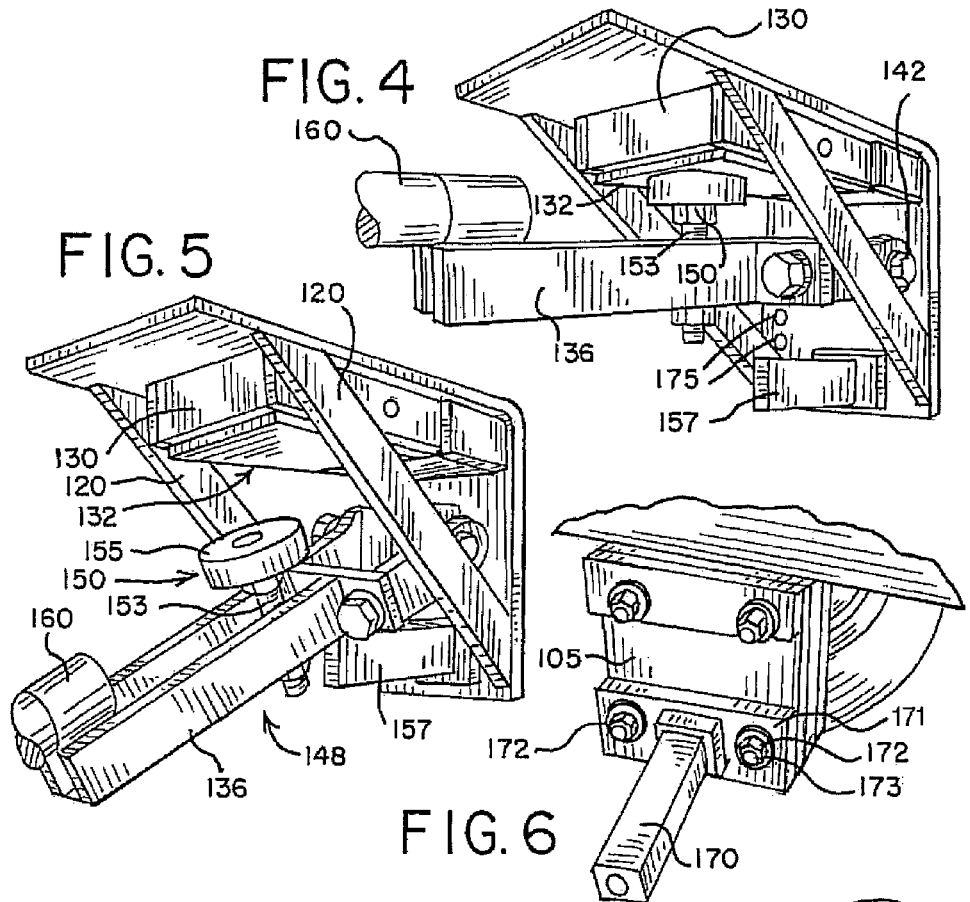
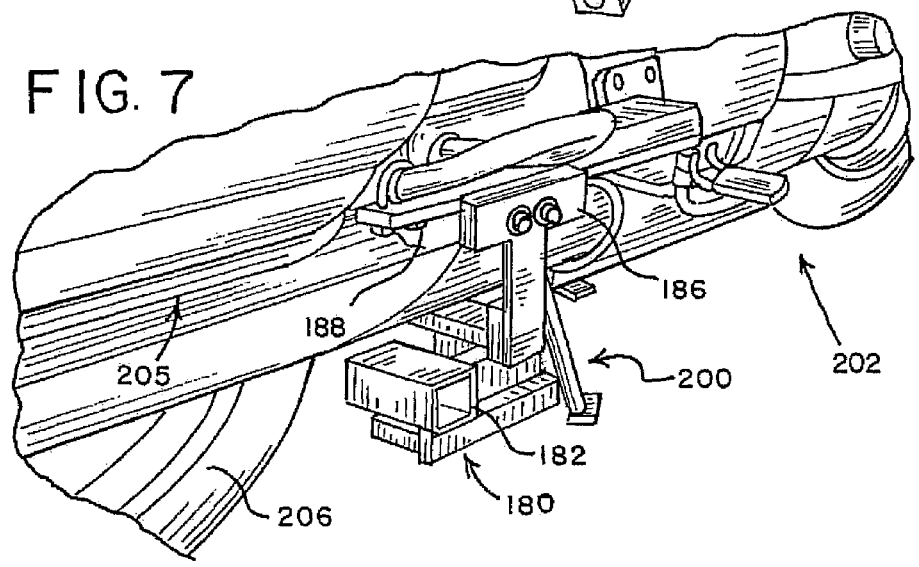

ADJUSTABLE SUSPENSION SYSTEM AND METHOD FOR SUSPENDING A VEHICLE

BACKGROUND OF THE INVENTION

The present invention generally relates to a suspension system and a method for suspending a vehicle. More specifically, the present invention relates to a suspension system that may be used in applications to provide an adjustable single resistance suspension system on a variety of vehicles, such as, for example, motorcycles, trikes, trailers, and the like.

Existing suspension systems used on vehicles have different levels of complexity and/or performance. Some suspension systems are relatively simple and provide basic levels of performance. However, due to their simplicity and corresponding relatively low levels of performance, the suspension systems may adversely affect the operation of the vehicle. For example, when the suspension system is relatively rigid, the ride of the vehicle may also be rigid or the ability to safely operate the vehicle may be hampered. Also, some of the simpler suspension systems lack adjustability. When the suspension system is not adjustable, the performance of the vehicle may also be adversely impacted and yield a rougher ride. The handling of the vehicle may also be negatively impacted when the suspension system is not adjustable or rigid. Typically, trailers, for example, are equipped with relatively simple and non-adjustable suspensions to keep down the cost of the trailer. However, the trailers are difficult to tow and/or maneuver, especially around corners and/or on rough roads. Consequently, vehicle operation and/or user safety is negatively impacted when the suspension system is inadequate. Thus, many of the existing suspension systems may cause numerous performance, comfort, ride and/or safety problems when operating a vehicle, a trailer or both.

Alternatively, other existing suspension systems provide much higher performance. For example, complex shock absorption and pneumatic ride suspensions provide high levels of performance for vehicles. However, the increase in complexity with such systems invariably results in increased costs and/or reliability issues. Such systems may also be difficult and/or expensive to maintain or repair.

Existing light duty suspension systems have many drawbacks. Therefore, a need exists for an effective suspension system that may be used in applications to provide an adjustable single resistance suspension system on a variety of vehicles, such as, for example, motorcycles, trikes, trailers, and the like.

Moreover, the suspension systems used in trikes, i.e., three-wheeled vehicles, or trike conversion kits may also benefit from a different suspension system. These vehicles have many different configurations. For example, conversion kits and assemblies for converting a two wheel motorcycle into a tricycle-type vehicle are known in the art. For example, U.S. Pat. No. 6,494,283 ("the '283 patent") and U.S. Pat. No. 6,739,420 ("the '420 patent") disclose an auxiliary wheel conversion assembly for a motorcycle. Further, U.S. Pat. No. 6,454,289 ("the '289 patent") discloses a trailer hitch cart for a motorcycle. The trailer cart or other trailer may also garner benefits from utilizing a different suspension system. These patents were issued to applicant of the present invention. The disclosure and figures of each patent are incorporated in their entireties herein by reference.

SUMMARY OF THE INVENTION

The present invention generally relates to a suspension system. More specifically, the present invention relates to a suspension system that may be used in applications to provide an adjustable single resistance suspension system on a variety of vehicles, such as, for example, motorcycles, trikes, trailers, and the like.

To this end, in an embodiment of the invention, a suspension apparatus is provided. The apparatus has a frame with a first portion and a second portion substantially perpendicular to the first portion. The apparatus has a swing arm with a first end and a second end. The first end is pivotably connected to the frame to allow movement of the swing arm from a first position to a second position. The apparatus also has a striker disposed between the first end and the second end of the swing arm. The striker contacts the first portion of the frame when the swing arm is in the first position. The apparatus has a spindle disposed at the second end of the swing arm. The apparatus has a travel stop connected to the frame and arranged to limit the movement of the swing arm when the swing arm is in the second position.

In an embodiment, the travel stop is disposed on the second portion of the frame.

In an embodiment, the apparatus has a rod end disposed at the first end of the swing arm.

In an embodiment, the apparatus has a pivot block disposed on the second portion of the frame.

In an embodiment, the striker is adjustable.

In an embodiment, the apparatus has a compressible element disposed on the first portion of the frame. The striker contacts the compressible element when the swing arm is in the first position.

In an embodiment, the compressible element has a selectable hardness.

In an embodiment, the apparatus has a resilient end on the striker.

In an embodiment, the resilient end on the striker has a selectable hardness.

In an embodiment, the spindle is connected on top of the second end of the swing arm.

In an embodiment, the axis of the spindle is above the axis of the swing arm.

In an embodiment, the apparatus has an attachment post connected to the second portion of the frame.

In an embodiment, the apparatus has a set of mounting holes in the second portion of the frame.

In an embodiment, the apparatus has a plurality of sets of mounting holes in the second portion of the frame.

In an embodiment, the movement of the swing arm from the first position to the second position is not restricted until the swing arm contacts the travel stop.

In an embodiment, the movement of the swing arm from the second position to the first position is restricted when the striker contacts the frame.

In an embodiment, the apparatus has a hub connected to the spindle.

In an embodiment, the apparatus has a plurality of compressible elements. Each of the compressible elements has a different hardness. One of the plurality of compressible elements connects to the first portion of the frame.

In an embodiment, the apparatus has a resilient end on the striker.

In an embodiment, the apparatus has a plurality of resilient ends. Each of the plurality of resilient ends has a different hardness. One of the plurality of resilient ends connects to the striker.

In an embodiment, the apparatus has an attachment post connected to the second portion of the frame.

In an embodiment, the apparatus has mounting holes in the second portion of the frame.

In another embodiment, a method for suspending a vehicle is provided. The method has the step of attaching a frame to the vehicle. The frame has a first section and a second section. The method also has the step of connecting a travel stop to the second section of the frame. The method further has the step of connecting a swing arm to the frame to permit movement of the swing arm relative to the frame. Finally, the method has the step of restricting the movement of the swing arm.

In an embodiment, the method has the step of allowing unrestricted movement of the swing arm relative to the frame until the swing arm contacts the travel stop.

In an embodiment, the method has the step of compressing an element of the frame with the striker.

In an embodiment, the method has the step of adjusting the position of the frame on the vehicle.

In an embodiment, the method has the step of attaching a compressible element to the first section of the frame.

In an embodiment, the method has the step of attaching a striker to the swing arm.

In an embodiment, the method has the step of adjusting the position of the striker.

In another embodiment of the invention, a suspension system for an auxiliary wheel conversion assembly for a motorcycle is provided. The system has a frame having a first portion and a second portion substantially perpendicular to the first portion. The system has a swing arm with a first end and a second end. The first end is pivotably connected to the frame to allow movement of the swing arm from a first position to a second position. The system has a striker disposed between the first end and the second end of the swing arm, wherein the striker contacts the first portion of the frame when the swing arm is in the first position. The system has a spindle disposed at the second end of the swing arm. A hub may be connected to the spindle. The system has a travel stop connected to the frame and arranged to limit the movement of the swing arm when the swing arm is in the second position. The system also has an attachment post connected to the second portion of the frame, and an attachment receiver connected to the motorcycle. The attachment post removably connects to the attachment receiver.

In an embodiment, the attachment post is adjustable with respect to the second portion of the frame.

In an embodiment, the attachment post is disposed below an axis of rotation of a wheel of the motorcycle.

In an embodiment, the system has mounting holes in the frame. The attachment post connects to the mounting holes.

It is, therefore, an advantage of the present invention to provide a suspension system that is used in applications to provide an adjustable single resistance suspension system on a variety of vehicles, such as, motorcycles, trikes, trailers, and the like.

An advantage of the present invention is to provide a method of suspending a vehicle.

Another advantage of the present invention is to provide a suspension system that is adjustable.

Moreover, an advantage of the present invention is to provide a suspension system that is quick and/or easy to install.

Yet another advantage of the present invention is to provide a suspension system that is quick and/or easy to remove.

Still further, an advantage of the present invention is to provide a suspension system that is economical.

Yet another advantage of the present invention is to provide a suspension system that is easy to maintain.

Still further, an advantage of the present invention is to provide a suspension system that is a single resistance system.

An advantage of the present invention is to provide a suspension system for a motorcycle having an auxiliary wheel assembly.

Moreover, an advantage of the present invention is to provide a suspension system that may be installed and/or removed with minimal effort and/or tools.

Additional features and advantages of the present invention are described in, and will be apparent from, the detailed description of the presently preferred embodiments and from the drawings.

BRIEF DESCRIPTION OF THE DRAWINGS

FIG. 4 is a perspective view of the embodiment of the suspension system in FIG. 3 illustrating the suspension system in a first position.

FIG. 5 is a perspective view of the embodiment of the suspension system in FIG. 3 illustrating the suspension system in a second position.

FIG. 6 is a perspective view of a portion of a suspension system in a further embodiment of the present invention.

FIG. 7 is a perspective view of a portion of a suspension system in a further embodiment of the present invention.

DETAILED DESCRIPTION OF THE PREFERRED EMBODIMENTS

The present invention generally relates to a suspension system. More specifically, the present invention relates to an adjustable single resistance suspension system that may be used in applications to provide an adjustable single resistance suspension system on a variety of vehicles, such as, for example, motorcycles, trikes, trailers, and the like.

To this end, in an embodiment of the invention, a suspension system is provided. The system has a frame with a first portion and a second portion substantially perpendicular to the first portion. The system has a swing arm with a first end and a second end wherein the first end is pivotably connected to the frame to allow movement of the swing arm from a first position to a second position. The system has a striker disposed between the first end and the second end of the swing arm. The striker contacts the first portion of the frame when the swing arm is located in the first position. The system has a travel stop connected to the frame and may limit the movement of the swing arm when the swing arm is located in the second position. The system has a spindle disposed at the second end of the swing arm. The system may also have a hub connected to the spindle for connecting a wheel.

Figure 1:
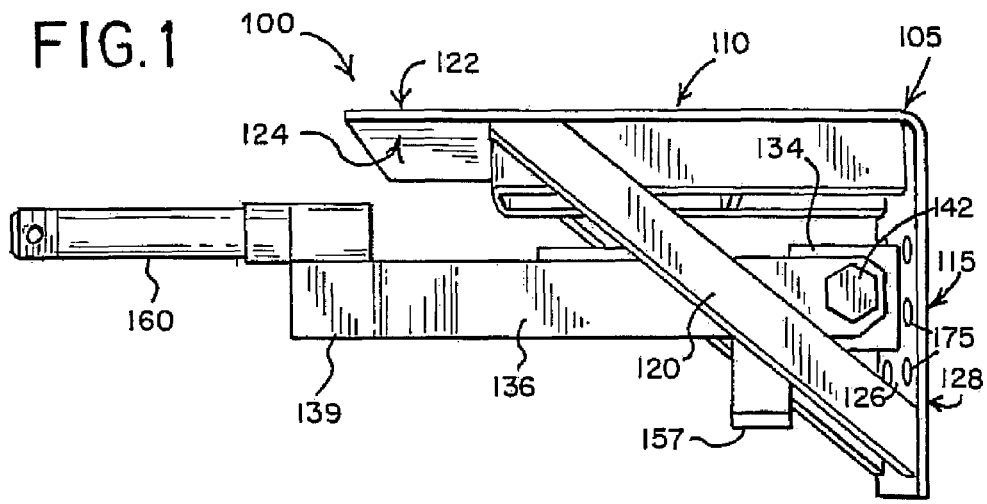
FIG. 1 is a side view of a suspension system in an embodiment of the present invention.
Figure 2:
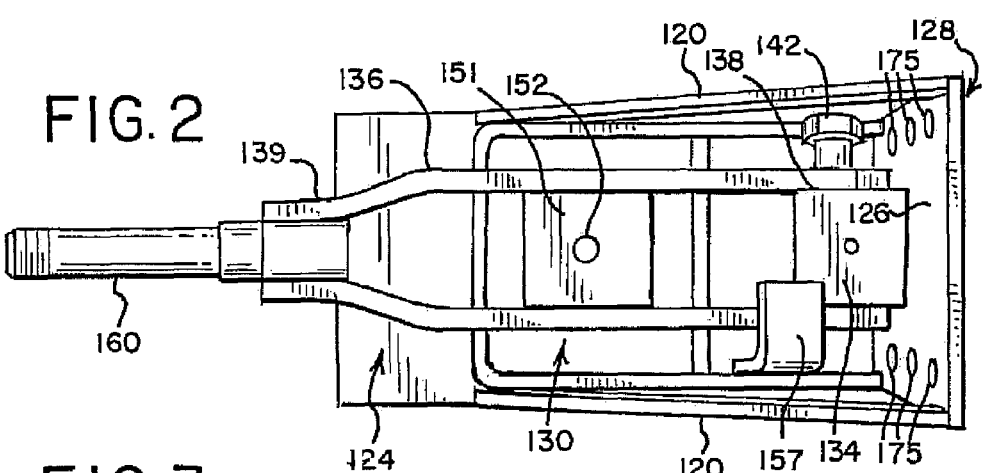
FIG. 2 is a bottom plan view of a suspension system in an embodiment of the present invention.
Figure 3:
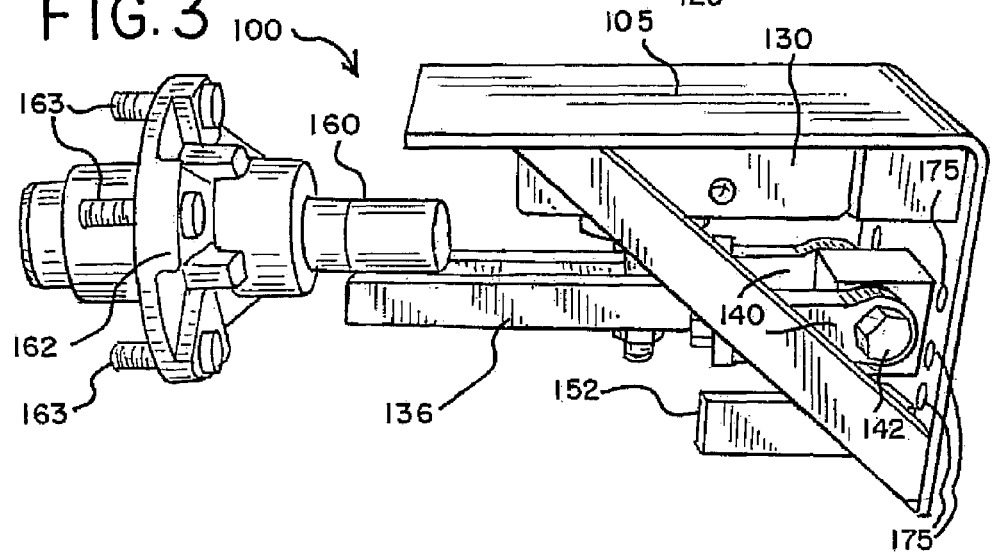
FIG. 3 is a side view of a suspension system in another embodiment of the present invention.

Referring now to the figures wherein like numerals refer to like parts, FIG. 1 is a side view of an embodiment of a suspension system 100. FIG. 2 is a corresponding bottom plan view of the suspension system 100. Moreover, FIG. 3 illustrates and additional components in another embodiment of the suspension system 100. Further, FIG. 4 is a perspective view of the embodiment of the suspension system 100 of FIG. 3.

As shown in FIGS. 1-4, the suspension system 100 may have a frame 105. The frame 105 may have a first portion 110 and a second portion 115. The second portion 115 may be substantially perpendicular to the first portion 110. Other variations and/or geometric configurations which are known to one having ordinary skill in the art are possible and are deemed to be within the scope of this disclosure. The frame 105 may be integrally formed from one piece of material and bent into the first portion 110 and the second portion 115. The frame 105 may also be formed of more than one piece of material and welded or otherwise joined together. The material may be selected from any suitable material that is of sufficient strength and/or durability to carry loads, withstand forces and/or handle torques that may be encountered in the operation of the suspension system 100. The material must also be capable of withstanding environmental conditions that may be encountered. For example, steel is strong and durable and may be manufactured into the frame 105 or other components of the suspension system 100. Considerations of weight and/or reliability are also important in the selection of the material. Thus, carbon fiber may also be a preferred material. Since carbon fiber possesses great strength with light weight, carbon fiber may also be used for the frame 105 or other components of the suspension system 100. Other materials which are known to one having ordinary skill in the art may be selected and are deemed to be within the scope of this disclosure.

The frame 105 may also have support members 120 connected to the first portion 110 and the second portion 115 of the frame 105 to provide increased rigidity and/or strength to the frame 105 and the system 100. The support members 120 may be welded or otherwise bonded to the frame 105. Known bonding techniques that are suitable for the type of material selected for the system 100 are considered to be within the scope of this disclosure. The support members 120 may also be integrally formed with the frame 105, if desired.

As shown in FIGS. 1-3, the first portion 110 of the frame 105 may also have a top surface 122 and a bottom surface 124. Similarly, the second portion 115 of the frame 105 may have an inner surface 126 and an outer surface 128. As shown in FIG. 2, a subframe 130 may be disposed on the bottom surface 124 of the first portion 110 of the frame 105.

Referring to FIG. 4 and FIG. 5, the subframe 130 may be configured and/or sized to retain a compressible element 132. The compressible element 132 may be a resilient pad formed of a known elastic or resilient compound, for example, a rubber or a durable polymer. The desired compressibility and/or shock absorption of the suspension system 100 may be selected by the type of material chosen for the compressible element 132 and/or the relative hardness of the compressible element 132. A number of compressible elements 132 of varying hardness or other properties may be provided so that the user may select a particular compressible element 132 for the specific type of application used or the conditions that may be encountered. The present invention is not limited to a specific embodiment of the compressible element 132.

As shown in FIGS. 1-4, the suspension system 100 may also have a pivot block 134 disposed on the inner surface 126 of the second portion 115 of the frame 105. The pivot block 134 may be connected to the frame 105 or integrally formed therewith. The pivot block 134 also may have a through hole (not shown). A swing arm 136 may be pivotably connected to the pivot block 134. The swing arm 136 has a first end 138 and a second end 139. In the embodiment shown in FIGS. 3-6, the first end 138 of the swing arm 136 may have a rod end 140. A pivot pin 142 may be used to connect the rod end 140 of the swing arm 136 to the pivot block 134. For example, the pivot pin 142 may be a bolt, axle or other suitable component. In the embodiment shown in FIG. 1 and FIG. 2, the swing arm 136 may connect to the pivot block 134 by inserting the pivot pin 142 through holes (not shown) in the first end 138 of the swing arm 136 and also through the through hole of the pivot block 134.

In each embodiment, the swing arm 136 may move in an angular manner with the pivot block 134 acting as the pivot point for the movement. The swing arm 136 may travel through an arc from a first position 146 as shown in FIGS. 1-4 to a second position 148 shown in FIG. 5.

As illustrated in FIG. 4 and FIG. 5, a striker 150 may be disposed between the first end 138 and the second end 139 of the swing arm 136. As shown in FIG. 2, the swing arm 136 may have a striker base 151 having a threaded hole 152 therethrough. The striker 150 may also have a threaded rod 153 to connect to the swing arm 136. The threaded rod 153 may be screwed into the threaded hole 152. The striker 150 may also be adjustable. For example, the striker 150 may be vertically adjusted by rotating the threaded rod 153 within the threaded hole 152 to raise or to lower the striker 150.

In an embodiment, the striker 150 may also have a resilient end 155. The resilient end 155 may be formed from any known elastic or resilient compound, for example, a rubber or a durable polymer. The desired compressibility and/or shock absorption of the suspension system 100 may be selected by the type of material chosen for the resilient end 155 and/or the relative hardness of the material of the resilient end 155. A number of resilient ends 155 of varying hardness or other properties may be provided so that the user may select a particular one of the resilient ends 155 for the specific type of application used or the conditions that may be encountered. The present invention is not limited to a specific embodiment of the resilient end 155.

When the swing arm 136 is located in the first position 148 as illustrated in FIG. 4, the resilient end 155 of the striker 150 may contact the compressible element 132 on the first portion 110 of the frame 105. The elastic nature of the resilient end 155 of the striker 150 and the compressible element 132 may allow each component to compress and/or absorb shock. The suspension system 100 may consequently provide a shock absorption effect for the vehicle on which the suspension system 100 may be mounted. As mentioned above, the amount of compression may be adjusted by selecting the compressible element 132 and/or the resilient end 155, accordingly. If more compression is desired for a softer ride, the hardness of the compressible element 132 and/or the resilient end 155 may be reduced. If less compression is desired for a firmer ride, a harder compressible element 132 and/or the resilient end 155 may be selected.

As illustrated in FIG. 5, when the swing arm 136 is located in the second position 148, the swing arm 136 may be restricted from further movement by a travel stop 157. In an embodiment, the travel stop 157 may be connected to the inner surface 126 of the second portion 115 of the frame 105. The travel stop 157 may also be integrally formed with the frame 105. The swing arm 136 may travel in the direction from the first position 146 shown in FIG. 4 to the second position shown in FIG. 5. Ultimately, however, the travel stop 157 may provide an impediment to the swing arm 136 when the swing arm 136 reaches the second position 148. The travel stop 157 may thereby restrict movement of the swing arm 136 in that direction. When the swing arm 136 moves in the opposite direction toward the first portion 110 of the frame 105 to reach the first position 146, the swing arm 136 may approach the compressible element 132 on the bottom surface 124 of the first portion 110 of the frame 105 and may encounter resistance when the resilient end 155 of the striker 150 contacts the compressible element 132. In this manner, the suspension system 100 may be a single resistance suspension system. As disclosed above, the suspension system 100 may also be adjustable by selecting different resilient ends 155 of the striker 150 and/or different compressible elements 132. The suspension system 100 may also be adjustable by raising and/or lowering the striker 150.

As illustrated in FIGS. 1-4, a spindle 160 may be disposed at the second end 139 of the swing arm 136. Further, as shown in FIG. 3, a hub 162 may be connected to the spindle 160. The hub 162 may be equipped with a plurality of lug bolts 163 which may be used to mount a wheel (not shown) to the suspension system 100. The wheel may be secured to the hub 162 by tightening a corresponding plurality of lug nuts (not shown) to the lug bolts 163, respectively.

The embodiment in FIG. 1 and the embodiment in FIG. 3 both show that the spindle 160 may be arranged on top of the swing arm 136. By arranging the axis of rotation of the spindle 160 and the hub 162 above the centerline of the body of the swing arm 136, the center of gravity of the suspension system 100 is effectively lowered which improves the stability of the suspension system 100 and/or the vehicle on which the suspension system 100 is mounted.

Another embodiment of the suspension system 100 may have additional components which may provide enhanced functionality of the suspension system 100. For example, the suspension system 100 may be used in combination with an auxiliary wheel conversion assembly for a motorcycle as disclosed in the '283 patent and the '420 patent previously discussed. The suspension system 100 may be integrated into the auxiliary wheel conversion assembly, as referenced at numeral 2. Thus, the suspension system 100 may be substituted as desired for the existing suspension disclosed in the '283 patent and/or the '420 patent. The advantages of the suspension system 100 of the present invention may thus be incorporated in the auxiliary wheel conversion assembly 2 of the '283 patent and/or the '420 patent. One having ordinary skill in the art will appreciate that the suspension system 100 may also be used with wheel conversion systems other than that disclosed in the '283 patent and the '420 patent as well as with trikes and other vehicles having two wheels, three wheels or more.

Further, the suspension system 100 may be used to provide an auxiliary wheel conversion assembly for a motorcycle. FIG. 6 and FIG. 7 illustrate such an embodiment. The suspension system 100 as described above may also have an attachment post 170 with a mounting plate 171 connected to the second portion 115 of the frame 105. The attachment post 170 may be connected to the outer surface 128 of the second portion 115 of the frame 105 by nuts 172 and bolts 173 connected through holes (not shown) in the mounting plate 171 or by some other suitable connection. For example, if desired, the mounting plate 171 and/or the attachment post 170 may be welded or otherwise secured to the outer surface 128 of the second portion 115 of the frame 105. However, if any adjustment of the attachment post 170 is desired, a plurality of mounting holes 175 may be provided in the second portion 115 of the frame 105 as shown in FIGS. 1-4. The mounting holes 175 are preferably arranged in pairs at different heights on the second portion 115 of the frame 105. Thus, the mounting holes 175 may be located at different heights that may permit adjustment of the height of the attachment post 170 on the second portion 115 of the frame 105. This adjustability may also permit the suspension system 100 to accommodate different wheel sizes, as desired. The center of gravity of the suspension system 100 relative to the vehicle on which the suspension system 100 is mounted may also be adjusted using the mounting holes 175, as desired. For example, the attachment post 170 may be disposed below the axis of rotation of an axle of the rear drive wheel of, for example, a motorcycle which may enhance stability of the motorcycle.

As FIG. 7 illustrates, the suspension system 100 may have additional components which may provide enhanced functionality of the suspension system 100. For example, the suspension system 100 may be used to provide an auxiliary wheel conversion assembly 200 for a motorcycle 202. The suspension system 100 may also have an attachment receiver 180 connected to the motorcycle 202. The attachment receiver 180 may have a receiving opening 182 that may be shaped and/or sized to accommodate the attachment post 170. Thus, to mount the suspension system 100 to the motorcycle 202, the attachment post 170 on the suspension system 100 may be inserted into the receiving opening 182 of the attachment receiver 180 on the motorcycle 202. The attachment post 170 may be removably connected to the attachment receiver 180 using nuts and bolts or other suitable connection to permit installation and/or removal of the suspension system 100 to the motorcycle 202.

FIG. 7 illustrates that the attachment receiver 180 may have a frame plate 186 that may be connected to a frame 188 of the motorcycle 202. The frame plate 186 may be removably connected or permanently affixed to the frame 188 of the motorcycle 202. The complete auxiliary wheel conversion assembly 200 for the motorcycle 202 may have a similar attachment receiver 180 and attachment post 170. The attachment receiver 180 and attachment post 170 may be used to connect another suspension system 100 on the opposite side of the motorcycle 202. Thus, the motorcycle 202 may be equipped with a suspension system 100 on each side to add stability to the motorcycle 202. One having ordinary skill in the art may recognize other means of connecting the suspension system 100 to a vehicle.

Further, as shown in FIG. 7, the attachment receiver 180 may be disposed below the axis of rotation of an axle 205 of a rear drive wheel 206 of the motorcycle 202. Thus, when the attachment post 170 is connected to the attachment receiver 180, the suspension system 100 is disposed lower than the axis of rotation of the drive wheel 206 of the motorcycle 202 which may enhance the balance and/or stability of the motorcycle 202.

The present invention is not limited to the arrangement of the components of the suspension system 100 illustrated in the Figures. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A suspension apparatus comprising:
  a frame having a first portion and a second portion wherein the second portion is substantially perpendicular to the first portion;
  a pivot block on the second portion of the frame;
  a swing arm having a first end and a second end wherein the first end is pivotably connected to the pivot block to allow movement of the swing arm from a first position to a second position;
  a striker between the first end and the second end of the swing arm wherein the striker contacts the first portion of the frame when the swing arm is located in the first position;

a spindle at the second end of the swing arm; and
a travel stop connected to the frame to limit the movement of the swing arm.

2. The apparatus of claim 1 wherein the travel stop connects to the second portion of the frame.

3. The apparatus of claim 1 further comprising:
a rod end at the first end of the swing arm.

4. The apparatus of claim 1 further comprising:
a threaded rod connecting the striker to the swing arm to adjust a relative position of the striker with respect to the frame.

5. The apparatus of claim 1 further comprising:
a compressible element on the first portion of the frame wherein the striker contacts the compressible element.

6. The apparatus of claim 1 further comprising:
a plurality of compressible elements wherein each of the plurality of compressible elements has a different hardness and further wherein one of the plurality of compressible elements connects to the first portion of the frame.

7. The apparatus of claim 1 further comprising:
a resilient end on the striker.

8. The apparatus of claim 1 further comprising:
a plurality of resilient ends wherein each of the plurality of resilient ends has a different hardness and further wherein one of the plurality of resilient ends connects to the striker.

9. The apparatus of claim 1 further comprising:
an attachment post connected to the second portion of the frame.

10. The apparatus of claim 1 further comprising:
mounting holes in the second portion of the frame.

11. A method for suspending a vehicle, the method comprising the steps of:
attaching a frame to the vehicle wherein the frame has a first section and a second section;
connecting a travel stop to the second section of the frame;
connecting a swing arm to the frame to permit movement of the swing arm relative to the frame;
attaching a striker to the swing arm; and
restricting the movement of the swing arm.

12. The method of claim 11 further comprising the step of:
allowing unrestricted movement of the swing arm relative to the frame until the swing arm contacts the travel stop.

13. The method of claim 11 further comprising the step of:
compressing an element of the frame with the striker.

14. The method of claim 11 further comprising the step of:
adjusting the position of the frame on the vehicle.

15. The method of claim 11 further comprising the step of:
attaching a compressible element to the first section of the frame.

16. The method of claim 11 further comprising the step of:
adjusting the position of the striker.

17. A suspension system for an auxiliary wheel conversion assembly for a motorcycle, the system comprising:
a frame;
a swing arm pivotably connected to the frame;
a striker connected to the swing arm wherein the striker contacts the frame;
a spindle on the swing arm;
a travel stop connected to the frame wherein the travel stop restricts movement of the swing arm;
an attachment post connected to the frame; and
an attachment receiver that connects to the attachment post.

18. The system of claim 17 further comprising:
mounting holes in the frame wherein the attachment post connects to the mounting holes.

19. A suspension apparatus comprising:
a frame having a first portion and a second portion wherein the second portion is substantially perpendicular to the first portion;
an attachment post connected to the second portion of the frame;
a swing arm having a first end and a second end wherein the first end is pivotably connected to the frame to allow movement of the swing arm from a first position to a second position;
a striker between the first end and the second end of the swing arm wherein the striker contacts the first portion of the frame when the swing arm is located in the first position;
a spindle at the second end of the swing arm; and
a travel stop connected to the frame to limit the movement of the swing arm.

\* \* \* \* \*